United States Patent [19]

West et al.

[11] Patent Number: 5,649,826

[45] Date of Patent: Jul. 22, 1997

[54] METHOD AND DEVICE FOR TEACHING LANGUAGE

[75] Inventors: Stephen G. West; Paul D. Meade, both of Chapel Hill, N.C.

[73] Assignee: Sum Total, Inc., Chapel Hill, N.C.

[21] Appl. No.: 618,364

[22] Filed: Mar. 19, 1996

[51] Int. Cl.$^6$ .......................... G09B 19/06; G09B 19/00; G09B 17/02

[52] U.S. Cl. ...................... 434/157; 434/156; 283/46

[58] Field of Search ................................ 434/157, 156; 283/46

[56] References Cited

U.S. PATENT DOCUMENTS 4,112,595  9/1978  Fernandez et al. .
5,178,542  1/1993  Chigrinsky et al. .

FOREIGN PATENT DOCUMENTS 2 311 368  10/1976  France .
2 008 238   2/1970  Germany .
  252785   10/1948  Switzerland .
  439819    8/1965  Switzerland .

OTHER PUBLICATIONS

Desmarais, Norman, Learning Language on Disc, CD–ROM Professional Apr. 1995.

Syracuse Language Systems, Triple Play Plus! User's Manual, pp. 2–3, 10–11, 12–13, 16–17, 58–59 1994.

*Primary Examiner*—Richard J. Apley
*Assistant Examiner*—John E. Rovnak
*Attorney, Agent, or Firm*—Richard E. Jenkins, P.A.

[57] ABSTRACT

A method and device for teaching a given language to one or more users in an entertaining manner is provided utilizing a media series for teaching a given language to one or more users, particularly young children. The media series contains the given language as well as language other than the given language and is made up of series lessons which sequentially contain an increasing percentage of the given language. A user is progressively exposed to the media series by exposing the user to the series lessons in sequential fashion beginning with a first series lesson containing a lowest percentage of the given language and ending with a last series lesson containing a highest percentage of the given language. The given language to be learned is utilized and presented strategically such that the meaning of the given language can be readily and intuitively understood and wherein no supervision is necessary.

14 Claims, No Drawings ns,826

METHOD AND DEVICE FOR TEACHING LANGUAGE

TECHNICAL FIELD

The present invention relates generally to methods and devices which can be utilized for teaching a subject such as a foreign language. More particularly, the present invention relates to a method and device for teaching a subject such as a foreign language wherein a user is exposed to lessons which sequentially incorporate an increasing percentage of the foreign language such that a user can readily understand, almost intuitively, the meaning of the foreign language.

DESCRIPTION OF PRIOR ART

Various methods and devices are available for teaching a subject such as a foreign language, and the teaching of foreign languages has become increasingly popular. Some of the methods and devices for teaching foreign language incorporate some form of interaction with a user, while other methods and devices utilize no form of interactive learning. Despite the existence of methods and devices for teaching a foreign language, learning a foreign language can still be a very difficult process.

One aspect contributing to the difficulty of learning a foreign language is that the sounds and words of the foreign language are not familiar and often are perceived as having an alien aspect to them. Another factor which can contribute to the difficulty of learning a foreign language is age since the optimal learning window for language comprises the early years of human development.

In the past, it has been very difficult to teach a foreign language to a young child since learning a foreign language has required concentration and attention of the type which children, especially young children, typically do not possess. Traditional techniques of learning foreign languages are usually not appropriate for young children since young children have difficulty focusing on grammar, vocabulary memorization and formal lessons in general. Although older students can usually learn a foreign language using traditional techniques, they are past their optimum language-learning years and thus frequently encounter much difficulty in learning foreign sounding words, phrases and syntax.

Teaching of a foreign language utilizing methods and devices available thus far often involves total immersion techniques wherein the language to be learned is either primarily or exclusively used. Total immersion techniques for learning a foreign language can work well when one is forced to communicate in a foreign language and there is no other alternative. Such total immersion techniques can fail miserably, however, when communication in the foreign language is not absolutely necessary. Examples of methods and devices using total immersion for teaching a foreign language include videos featuring songs entirely in a foreign language and written materials using one hundred percent (100%) of a foreign language.

One example of a foreign language teaching device is disclosed in U.S. Pat. No. 4,112,595 to Fernandez et al. wherein two separate books are utilized that each contain a number of questions in a given language. Each question is provided with a number and followed by a model correct answer. The first book may contain successively odd-numbered questions and the second book may contain successively even-numbered questions, and the questions are constructed so as to simulate a conversation between two students utilizing the pair of books. Thus, the holder of book one initiates the conversation by reading question one aloud to the other student who answers without help if he or she can, and the holder of book one guides the other student with the model answer if he or she fails to answer the first question correctly. Next, the second student with the second book reads question two to the first student who answers if he or she can. If the first student cannot answer the second question posed by the second student from book two, the second student coaches the first student from the model answer to question two set forth in the second book. In this fashion, the exchange of questions, answers, and tutoring develops the skills at speaking a selected foreign language.

Another device adapted for use in teaching and learning a selected foreign language is disclosed in U.S. Pat. No. 5,178,542 to Chigrinsky et al. Specifically, the learning aid of Chigrinsky et al. is directed to allowing the reader to become accustomed to full phrase translation as opposed to word-by-word translation. The device comprises a book having one or more pages wherein each page incorporates text and related artwork in a comic book format. A thin, clear overlay sheet is provided for each page of the book and is identical to the book page therebeneath except that the text is in a foreign language to be learned by the user. Thus, with the overlay in position, the reader sees only the text to be translated, and by raising the overlay, the reader can see the translation of the foreign language set forth on the overlay sheet.

French Patent Publication No. 2 311 368 discloses a method for studying foreign languages comprising utilizing strip cartoons with the same subject matter in both the known language and the foreign language. The strip cartoons can be used separately or together.

Additionally, Swiss Patent No. 252,785 discloses an educational device for the study of foreign languages comprising a sheet of text divided into three (3) sections. The first section utilizes an association lesson and provides text in a foreign language, preferably with a translation of the text therebeneath, that includes drawings of certain words, such as "man", "boy", and "cow", combined with the words. The next session comprises a reproduction lesson and includes additional foreign language text with the same pictures set forth in the first section but with the foreign word and translated word omitted so as to force an association between the picture and word formed in the first session. Finally, the third section of the sheet comprises a transposition lesson by setting forth a foreign text, with associated translation, and pictures identical to those in the first section but used in association with a different but phonetically similar word.

Despite the prior art methods and devices for teaching a foreign language, all of which depend largely or exclusively upon the ability of a user or student to read, much room for improvement exists in the art, particularly for a method and device for teaching a foreign language which is effective, systematic, entertaining and especially useful for young children who have yet to acquire the ability to read.

SUMMARY AND OBJECTS OF THE INVENTION

The present invention provides a method and device for teaching a given language to one or more users. This is accomplished by use of a media series for teaching a given language to one or more users wherein the media series comprises the given language as well as language other than given language. The media series is made up of a plurality of series levels or lessons which sequentially contain an increasing percentage of the given language. A user is exposed to the media series by progressively exposing the user to the series lessons in sequential fashion beginning with a first series lesson containing a lowest percentage of the given language and ending with a last series lesson containing a highest percentage of the given language. For example, the first series lesson contains a percentage of up to approximately thirty percent (30%) of the given language, and the last series lesson contains a percentage of more than approximately eighty percent (80%) of the given language. The last series lesson preferably is entirely in the given language.

It is therefore an object of the present invention to provide a novel method and device for teaching a given language to one or more users.

It is another object of the present invention to provide a method and device for teaching a given language which provides multiple media methodologies for teaching a given language.

It is yet another object of the present invention to provide a method and device for teaching a given language wherein the given language can be systematically, effectively and easily learned by users of all ages, particularly young children.

It is a further object of the present invention to provide a method and device for teaching a given language which can be utilized by a single user without the need for participation or guidance by others.

It is yet a further object of the present invention to provide a method and device for teaching a given language which draws a user's interest and attention and wherein each user is entertained while learning.

It is a still further object of the present invention to provide a method and device for teaching a given language which can be used while a user is substantially unaware of the learning as it occurs.

Some of the objects of the invention having been stated hereinabove, other objects will become evident as the description proceeds.

DETAILED DESCRIPTION

The present invention provides a novel method and device for teaching languages to people and makes use of a systematic and entertaining approach to learning languages using singular or multiple media methodologies. Utilizing the method and device according to this invention, a user is progressively exposed to lessons in a desired media with a continually increasing percentage of the language to be learned.

In accordance with this invention, a device for teaching a given language to one or more users is provided. The device comprises a media series for teaching a given language to one or more users wherein the media series comprises the given language as well as language other than the given language. The media series preferably comprises a foreign language to be learned and the user's "native" language. The media series is made up of a plurality of series levels or lessons, which sequentially contain an increasing percentage of the foreign language.

The media series can be utilized to expose a user to written, audible, visual, or written, audible and visual words which preferably form a story. Each series lesson can include one or more stories, and the material in each series lesson can follow up or succeed the story or stories of a preceding series lesson. Alternatively, each series lesson can contain an entirely new story or stories not related to either of the other series lessons, or each series lesson can present an identical story as the other series lessons while only differing from the other series lessons by the content amount of the foreign language. It is also envisioned that the media series can include stories which impart a moral or ethical message. Regardless of the connection or lack of connection that the story or stories within each series lesson have, each series lesson provides text, sounds, pictures or a combination thereof as the series lessons sequentially incorporate an increasing amount of the foreign language to be learned. Throughout each series lesson, it is preferred that the foreign language be strategically used so that the context within which the foreign language is used makes the translation and meaning of the foreign language obvious and intuitive.

According to the method and device of this invention, the first series lesson contains the lowest percentage of the foreign language which preferably is no greater than approximately thirty percent (30%), but can be zero. The last series lesson contains the highest percentage of the foreign language, and most preferably that percentage is one hundred percent (100%) so that by the time the user reaches the end of the media series, the user sees, hears, or sees and hears the last lesson completely in the foreign language. There can be any number of series lessons between the first and last series lessons, and the percentage content of the foreign language in these series lessons can vary as desired. As an example, a second lesson could be twenty-five percent (25%) foreign language and seventy-five percent (75%) native language; a third lesson could be half foreign language and half native language; and a fourth lesson, leading up to a final fifth lesson, could be seventy-five percent (75%) foreign language and twenty-five percent (25%) native language. It can frequently be desirable to vary the percentage content of foreign language depending upon the type of media utilized, as described further below.

TEXTUAL MEDIA APPLICATION

The media series according to this invention can comprise textual material such as one or more printed books or booklets. In this format, each series lesson in the media series consists of a written story or stories which can be read by a user. The first series lesson in this format includes a low percentage of the foreign language, for example, up to approximately fifteen percent (15%). The successive series lessons in this format each have an increased percentage of the foreign language from a preceding series lesson until the last series lesson is reached which preferably is written entirely in the foreign language. Each successive series lessons in this media series includes foreign words already learned in a previous series lesson plus additional foreign words or alternatively includes completely new and unrelated foreign words.

When the media series comprises textual material, it is contemplated according to this invention that words of the chosen foreign language can be caused by the user to be selectively audibly pronounced by the user activating one or more audio chips which can be included in the media series. The foreign word or words pronounced typically are represented by a picture used in association with the story text. In this manner, the user can hear a foreign word or words expertly pronounced. It is also envisioned according to this invention that this format utilizing an audio chip to pronounce representative pictures can exist by itself without accompanying textual material.

AUDIBLE MEDIA APPLICATION

The media series according to this invention can comprise audible material which is electronically stored sound material. The specific types of audible materials which can be used are one or more cassette tapes and/or compact discs, however, these are provided as examples and not as a limitation, and it is envisioned that other specific formats could be utilized for the electronically stored sound material.

When the media series comprises audio material, a user can listen to each of the series lessons sequentially. It is envisioned according to this invention that the audible material can be utilized by itself, or that textual, pictorial or a combination of such materials can be utilized in association with the audible material.

AUDIOVISUAL MEDIA APPLICATION

The media series according to this invention can also comprise audiovisual material. This audiovisual material preferably is electronically stored sound and visual material, and can be in the form of, for example, one or more videotapes or electronically stored sound and visual material adapted for use on a computer, such as one or more compact discs, diskettes and/or digital videodiscs (DVD's). When the media series comprises electronically stored sound and visual material, a user can cause the media series to be electronically processed in order for the user to simultaneously listen to and view the series lessons within the media series.

When the media series comprises one or more videotapes, the series lessons strategically utilize foreign language inserted in such a way as to enable the user to readily understand, almost intuitively, the meaning of the foreign language. This can be accomplished by use of gestures of a character in the videotape which make the meaning of one or more foreign words obvious. An example of this situation is where a character in the video tape asks, "does a dog bark?", whereupon another character replies "oui". The responding character can even nod his or her head while saying "oui", thereby reinforcing the context surrounding the use of the foreign word and obviating the need for any explanation.

The second series lesson of the media series comprising videotapes can contain foreign words already used in the first series lesson, additional foreign words that are inserted to enhance or modify foreign words used previously in a series lesson, such as the "big" house or the "big, red" house, or can contain completely new and independent foreign words unrelated to the previous series lessons. The second and successive series lessons can double or more than double the percentage of foreign word content from a previous series lesson as desired. Thus, a user progresses sequentially through the series lessons with increased exposure to the foreign language until the last series lesson is reached which comprises only the foreign language and no other language. A user's attention and interest is therefore focused by a series of related or unrelated stories which teach the user while keeping the user entertained so that the user is often substantially unaware that the foreign language is being learned.

The media series according to this invention can comprise electronically stored sound and visual material adapted for presentation on a computer. In this manner, the media series can be processed on a computer and the user can interact with the series lessons as described further below. It is also envisioned that a computer can be used to process either the electronically stored sound information or the electronically stored visual information by itself, however, it is preferred that both sound and visual electronically stored material be presented by processing the media series on a computer for best potential comprehension and in light of the growing multi-media aspects of computers.

Utilizing a computer, the series lessons can be visually, audibly, or visually and audibly perceived by the user. It is contemplated that various parameters can exist and that a user can select ranges within the parameters regarding the content of each series lesson before or after it is presented while the series lessons as a whole continue to sequentially contain an increased percentage of the foreign language. An example of one such parameter that can be selected by the user is the precise percentage of foreign language included within a given series lesson which effectively allows the user to select the difficulty based upon the user's foreign language proficiency. Another example of a parameter which can be controlled to an extent by the user is that the user can select and control the speed at which the presentation is given.

When a user is allowed to control the percentage of foreign language content in a given series lesson, the percentage which can be selected can be controlled by the computer to be between a predetermined minimum and maximum for each series lesson. Furthermore, it is envisioned that an interactive means can be utilized with the computer in order for the user to demonstrate a requisite understanding or comprehension of certain foreign language in order to advance to a successive series lesson. This demonstration of comprehension by the user can be in the form of the user responding to audio cues, pointing to illustrations, answering written queries, or any other method of analysis. Additionally, it is envisioned that during a computer presentation of a series lesson according to this invention, a user can pause the presentation and point and click on any illustrated object in the presentation whereupon the foreign language name or phrase of the object is identified to the user. Utilizing a computer to present the media series according to this invention also allows multiple users to utilize the media series, provides means for storing information regarding each particular users progress through the media series and even allows a user to stop a lesson and resume the lesson at a later date picking up exactly where he or she left off.

It is therefore seen that the present invention provides a novel method and device for teaching a given language to one or more users. The present invention can be in multiple media forms for teaching one or more given languages systematically, effectively and easily to users of all ages. Advantageously, the present invention can be utilized by a single user without the need for participation or guidance by others.

It can also be appreciated that the present invention provides a method and device for teaching a given language which draws a user's interest and attention wherein each user is entertained while learning. The method and device of this invention can be used to teach a user a foreign language while the user is substantially unaware of the learning as it occurs.

It will be understood that various details of the invention may be changed without departing from the scope of the invention. Furthermore, the foregoing description is for the purpose of illustration only, and not for the purpose of limitation as the invention is defined by the following appended claims.

What is claimed is:

1. A method for teaching a given language to one or more users, said method comprising the steps of:

A. providing a media series for teaching a given language to one or more users, said media series comprising said given language and language other than said given language and said media series having a plurality of series lessons which sequentially contain an increasing percentage of said given language and which each utilize said given language in context such that its meaning can be obviously and intuitively understood by said one or more users; and B. exposing each user to said media series by progressively exposing each user to said series lessons in sequential fashion wherein each series lesson sequentially contains an increasing percentage of said given language, whereby the meaning of said given language can be understood by each user obviously and intuitively in each series lesson.

2. A method for teaching a given language to one or more users, said method comprising sequentially exposing each user to a plurality of series lessons incorporating a given language and language other than said given language wherein said given language is utilized in context such that its meaning can be obviously and intuitively understood by each user and wherein each series lesson sequentially contains an increasing percentage of said given language with a first of said series lessons containing up to thirty percent (30%) of said given language and a last of said series lessons containing eighty percent (80%) or more of said given language.

3. A device for teaching a given language to one or more users comprising:

A. a media series for teaching a given language to one or more users, said media series comprising said given language and language other than said given language; and B. said media series having a plurality of series lessons wherein said given language is utilized in context such that its meaning can be obviously and intuitively understood by said one or more users, said series lessons sequentially containing an increasing percentage of said given language.

4. A method for teaching a given language to one or more users, said method comprising the steps of:

A. providing a media series for teaching a given language to one or more users, said media series comprising said given language and language other than said given language and said media series having a plurality of series lessons which sequentially contain an increasing percentage of said given language and which each utilize said given language in context such that its meaning can be obviously and intuitively understood by said one or more users;

B. exposing each user to said media series by progressively exposing each user to said series lessons in sequential fashion wherein each series lesson sequentially contains an increasing percentage of said given language, whereby the meaning of said given language can be understood by each user obviously and intuitively in each series lesson; and C. wherein said media series comprises printed material which can be read by a user and wherein exposing each user to said media series comprises each user reading said printed material.

5. A method for teaching a given language to one or more users, said method comprising the steps of:

A. providing a media series for teaching a given language to one or more users, said media series comprising said given language and language other than said given language and said media series having a plurality of series lessons which sequentially contain an increasing percentage of said given language and which each utilize said given language in context such that its meaning can be obviously and intuitively understood by said one or more users;

B. exposing each user to said media series by progressively exposing each user to said series lessons in sequential fashion wherein each series lesson sequentially contains an increasing percentage of said given language, whereby the meaning of said given language can be understood by each user obviously and intuitively in each series lesson; and C. wherein said media series comprises printed material and exposing each user to said media series comprises each user reading said printed material, and wherein each user first reads a first series lesson containing only language other than said given language.

6. A method for teaching a given language to one or more users, said method comprising the steps of:

A. providing a media series for teaching a given language to one or more users, said media series comprising said given language and language other than said given language and said media series having a plurality of series lessons which sequentially contain an increasing percentage of said given language and which each utilize said given language in context such that its meaning can be obviously and intuitively understood by said one or more users;

B. exposing each user to said media series by progressively exposing each user to said series lessons in sequential fashion wherein each series lesson sequentially contains an increasing percentage of said given language, whereby the meaning of said given language can be understood by each user obviously and intuitively in each series lesson; and C. wherein said media series comprises printed material and exposing each user to said media series comprises each user reading said printed material, and wherein each user first reads a first series lesson at least five percent (5%) of which is in said given language.

7. A method for teaching a given language to one or more users, said method comprising the steps of:

A. providing a media series for teaching a given language to one or more users, said media series comprising said given language and language other than said given language and said media series having a plurality of series lessons which sequentially contain an increasing percentage of said given language and which each utilize said given language in context such that its meaning can be obviously and intuitively understood by said one or more users;

B. exposing each user to said media series by progressively exposing each user to said series lessons in sequential fashion wherein each series lesson sequentially contains an increasing percentage of said given language, whereby the meaning of said given language can be understood by each user obviously and intuitively in each series lesson; and C. wherein each user is lastly exposed to a last series lesson one hundred percent (100%) of which is in said given language.

8. A method for teaching a given language to one or more users, said method comprising the steps of:

A. providing a media series for teaching a given language to one or more users, said media series comprising said given language and language other than said given language and said media series having a plurality of series lessons which sequentially contain an increasing percentage of said given language and which each utilize said given language in context such that its meaning can be obviously and intuitively understood by said one or more users;

B. exposing each user to said media series by progressively exposing each user to said series lessons in sequential fashion wherein each series lesson sequentially contains an increasing percentage of said given language, whereby the meaning of said given language can be understood by each user obviously and intuitively in each series lesson; and C. wherein said media series comprises electronically stored sound material on an audio cassette, video cassette, compact disc, computer diskette or digital video disc which can be electronically accessed to hear said sound material, and wherein exposing each user to said media series comprises each user electronically accessing said audio cassette, video cassette, compact disc, computer diskette or digital video disc to listen to said sound material.

9. A method for teaching a given language to one or more users, said method comprising the steps of:

A. providing a media series for teaching a given language to one or more users, said media series comprising said given language and language other than said given language and said media series having a plurality of series lessons which sequentially contain an increasing percentage of said given language and which each utilize said given language in context such that its meaning can be obviously and intuitively understood by said one or more users;

B. exposing each user to said media series by progressively exposing each user to said series lessons in sequential fashion wherein each series lesson sequentially contains an increasing percentage of said given language, whereby the meaning of said given language can be understood by each user obviously and intuitively in each series lesson; and C. wherein said media series comprises printed material which can be read by a user and a digital audio chip which can be electronically activated to produce sound, and wherein exposing each user to said media series comprises each user reading said printed material and electronically activating said digital audio chip to listen to sound from said digital audio chip.

10. A method for teaching a given language to one or more users, said method comprising the steps of:

A. providing a media series for teaching a given language to one or more users, said media series comprising said given language and language other than said given language and said media series having a plurality of series lessons which sequentially contain an increasing percentage of said given language and which each utilize said given language in context such that its meaning can be obviously and intuitively understood by said one or more users;

B. exposing each user to said media series by progressively exposing each user to said series lessons in sequential fashion wherein each series lesson sequentially contains an increasing percentage of said given language, whereby the meaning of said given language can be understood by each user obviously and intuitively in each series lesson; and C. wherein said media series comprises electronically stored sound and visual material on a video cassette, compact disc, computer diskette, or digital video disc which can be electronically accessed to hear said sound material and view said visual material, and wherein exposing each user to said media series comprises each user electronically accessing said video cassette, compact disc, computer diskette, or digital video disc to listen to said sound material and view said visual material.

11. A device for teaching a given language to one or more users comprising:

A. a media series for teaching a given language to one or more users, said media series comprising said given language and language other than said given language;

B. said media series having a plurality of series lessons which sequentially contain an increasing percentage of said given language; and C. wherein said media series comprises printed material which can be read by a user.

12. A device for teaching a given language to one or more users comprising:

A. a media series for teaching a given language to one or more users, said media series comprising said given language and language other than said given language;

B. said media series having a plurality of series lessons which sequentially contain an increasing percentage of said given language; and C. wherein said media series comprises electronically stored sound material on an audio cassette, video cassette, compact disc, computer diskette or digital video disc which can be electronically accessed by a user to hear said sound material.

13. A device for teaching a given language to one or more users comprising:

A. a media series for teaching a given language to one or more users, said media series comprising said given language and language other than said given language;

B. said media series having a plurality of series lessons which sequentially contain an increasing percentage of said given language; and C. wherein said media series comprises printed material which can be read by a user and electronically stored sound material on digital audio chips which can be electronically activated by a user to hear said sound material.

14. A device for teaching a given language to one or more users comprising:

A. a media series for teaching a given language to one or more users, said media series comprising said given language and language other than said given language;

B. said media series having a plurality of series lessons which sequentially contain an increasing percentage of said given language; and C. wherein said media series comprises electronically stored sound and visual material on a video cassette, compact disc, computer diskette or digital video disc which can be electronically accessed by a user to hear said sound material and view said visual material.

* * * * *